US012291972B2

(12) United States Patent
Strada et al.

(10) Patent No.: US 12,291,972 B2
(45) Date of Patent: May 6, 2025

(54) OFFSHORE STEAM TURBINE GENERATOR UNIT AND INSTALLING METHOD

(71) Applicant: NUOVO PIGNONE TECNOLOGIE—SRL, Florence (IT)

(72) Inventors: Francesco Strada, Florence (IT); Jacopo Barsali, Florence (IT); Emanuele Polacci, Florence (IT); Andrea Tradii, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/552,372

(22) PCT Filed: Mar. 24, 2022

(86) PCT No.: PCT/EP2022/025121
§ 371 (c)(1),
(2) Date: Sep. 25, 2023

(87) PCT Pub. No.: WO2022/207144
PCT Pub. Date: Oct. 16, 2022

(65) Prior Publication Data

US 2024/0175377 A1 May 30, 2024

(30) Foreign Application Priority Data

Mar. 30, 2021 (IT) ........................ 102021000007823

(51) Int. Cl.
*F01D 25/28* (2006.01)
*F01D 25/04* (2006.01)

(52) U.S. Cl.
CPC ............ *F01D 25/28* (2013.01); *F01D 25/04* (2013.01); *F05D 2230/60* (2013.01)

(58) Field of Classification Search
CPC .......... F01D 25/28; F01D 25/04; F01D 15/10; F05D 2230/60; F01K 13/00; F01K 11/02
See application file for complete search history.

(56) References Cited

U.S. PATENT DOCUMENTS

| | | | | | |
|---|---|---|---|---|---|
| 2,259,214 | A * | 10/1941 | Rosenzweig | F16F 1/44 | 249/187.1 |
| 3,425,906 | A * | 2/1969 | Weber | F22B 1/08 | 165/47 |
| 3,791,682 | A * | 2/1974 | Mitchell | F02C 7/20 | 290/1 R |
| 4,206,013 | A * | 6/1980 | Dickey | F01K 11/02 | 165/47 |
| 4,311,016 | A * | 1/1982 | Kaelber | F01D 25/28 | 60/692 |

(Continued)

FOREIGN PATENT DOCUMENTS

JP S61 14404 A 1/1986

*Primary Examiner* — Jesse S Bogue
(74) *Attorney, Agent, or Firm* — Paul Frank + Collins P.C.

(57) ABSTRACT

A steam turbine generator unit is disclosed. The steam turbine generator unit comprises a lower deck, an upper deck, and a steam turbine generator. The steam turbine generator is installed on the lower deck and on the upper deck. The steam turbine generator unit also comprises at least three joint members, to be intended placed over at least two parallel beams. Also disclosed is a method for installing a steam turbine generator unit.

10 Claims, 17 Drawing Sheets

(56) References Cited

U.S. PATENT DOCUMENTS

| | | | | | |
|---|---|---|---|---|---|
| 5,094,588 | A * | 3/1992 | Gros | F01K 11/02 60/692 |
| 10,895,202 | B1 * | 1/2021 | Yeung | F02C 7/20 |
| 11,326,465 | B2 * | 5/2022 | Fujimura | F01K 23/108 |
| 2007/0131839 | A1 | 6/2007 | Dunn et al. | |
| 2009/0321607 | A1 * | 12/2009 | Baron | F16F 15/022 248/560 |
| 2012/0228862 | A1 * | 9/2012 | Sullivan | F01D 25/26 285/41 |
| 2016/0305270 | A1 * | 10/2016 | Marcucci | F02C 3/10 |
| 2018/0186442 | A1 * | 7/2018 | Maier | F16M 1/00 |
| 2019/0353055 | A1 | 11/2019 | Nishikawa et al. | |

* cited by examiner

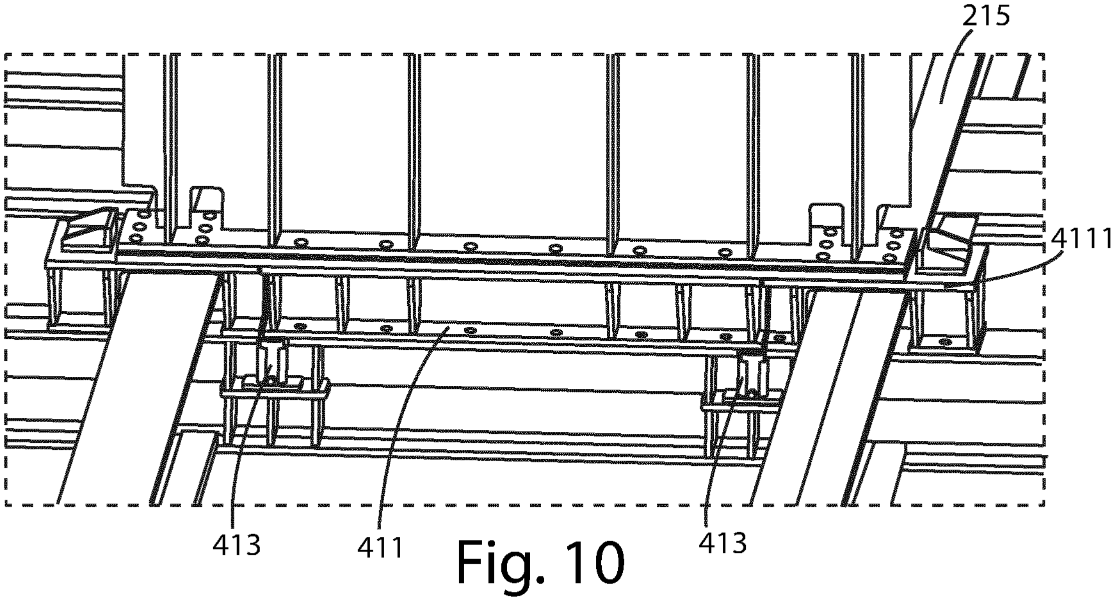
Fig. 10
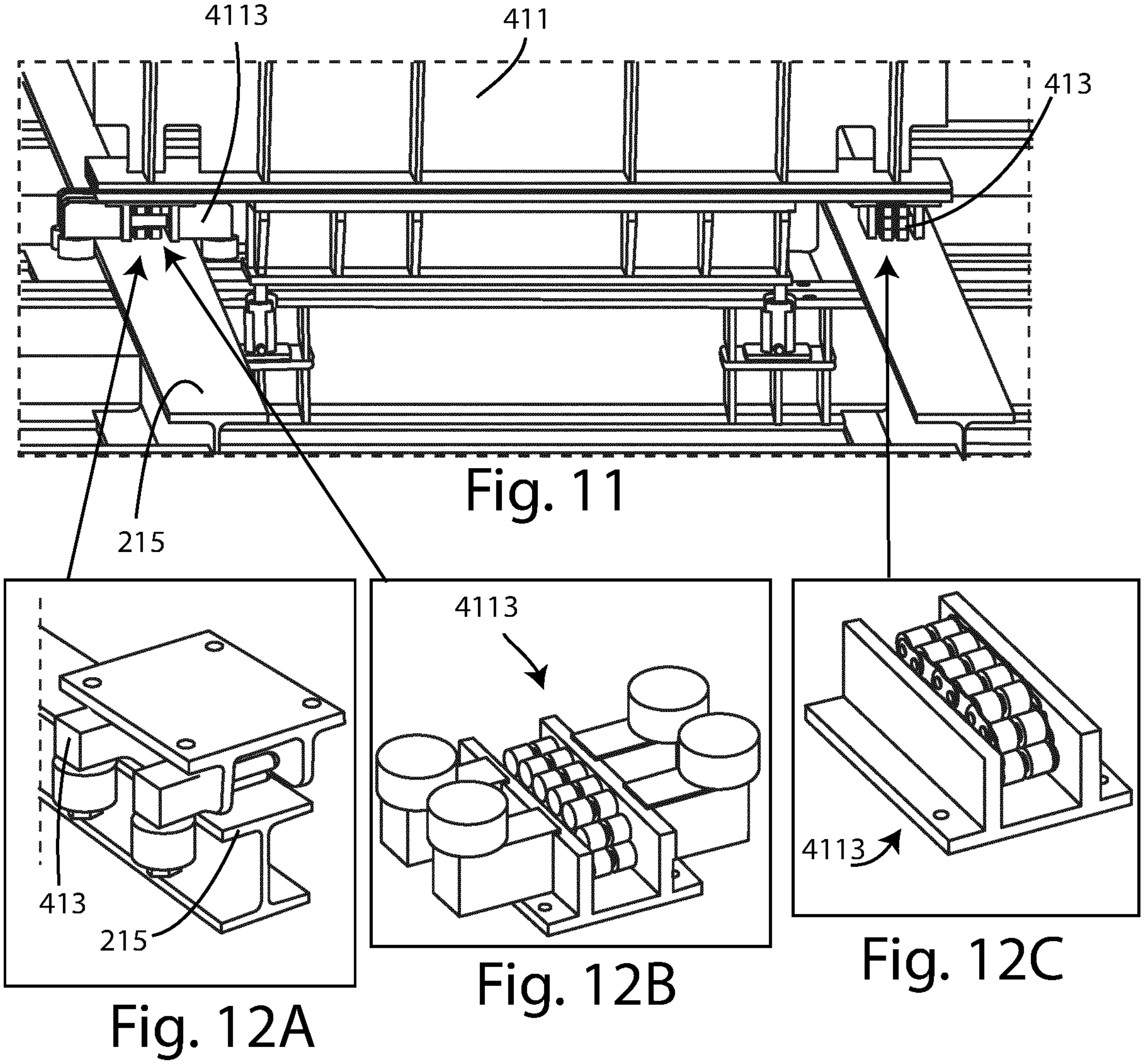
Fig. 11
Fig. 12A
Fig. 12B
Fig. 12C

OFFSHORE STEAM TURBINE GENERATOR UNIT AND INSTALLING METHOD

TECHNICAL FIELD

The present disclosure concerns a steam turbine generator unit, intended to be installed in an off shore installation, and a method for installing a steam turbine generator unit.

Background Art

Steam turbines are installed in either onshore and offshore platforms, where the latter is mainly used for extracting gas from deposits placed under the seabed.

The installation of the steam turbines in offshore platforms requires considerable time, owing to a large number of devices and auxiliary components to be mounted and adapted to the specific location where the steam turbine has to be placed.

In addition, offshore platforms have space constraints, such that it's usually required a reduced footprint of any installations. Usually, steam turbines occupy a certain amount of space, and therefore reduce their footprints would be welcome in the field.

Also, as mentioned, steam turbines foreseen lots of auxiliary equipment shipped loose and installed directly at the site by the customer. Usually, a steam turbine installation can count up to 10-15 main parts, excluding the pipelines and other elements for connecting such main parts. Also, the installation of a steam turbine has to be done on-site. This causes a remarkable increase of complexity and necessarily an increase in the overall installation costs. It turns out that a remarkable amount of time is required for installing a turbine, which includes connecting all different equipment.

Even more, usually, steam condensers are installed below the main skid, so the exhaust duct that connects a steam turbine to a condenser can suffer of fatigue phenomena that lead to an over-design of the duct itself.

Both approaches negatively affect operating costs of the installation activities. Accordingly, an improved and compact steam turbine installation capable of overcoming the limitations of the prior art practices would be welcomed in the technology.

SUMMARY

In one aspect, the subject matter disclosed herein is directed to a steam turbine generator unit, preferably intended to be installed on an offshore platform, comprising a lower deck and an upper deck. The upper deck is coupled to the lower deck. A steam turbine generator is installed on the upper deck.

In another aspect, disclosed herein is that the supports of the upper deck may be Anti Vibrations Mounts (AVMs) and/or spherical joints and are also capable of amortizing and dampen possible vibration.

In another aspect, disclosed herein is that the main steam condenser, the gland steam condenser, and other auxiliaries of the Steam Turbine are preinstalled on the frame of the lower deck.

In another aspect, disclosed herein is that the steam turbine generator comprises a steam turbine and a generator, which are preinstalled on the base platform of the upper deck.

In one aspect, the subject matter disclosed herein is directed to an exhaust duct, connected to a coupling flange of the condenser and the steam turbine through a flexible expansion joint.

A further aspect of the present disclosure is drawn to a method of installing a steam turbine generator unit, including the steps of arranging the lower deck in the installation position, before lowering down the upper deck, such that the baseplate upper deck is placed over at least two beams of an offshore platform in three points, by three joint members of the upper deck. Then the lower deck is lifted up from the ground, and the lower deck is connected to the upper deck.

In another aspect, disclosed herein is that the lower deck is preliminarily lowered down on temporary supports, placed on the ground, and then the supporting beams the offshore platform are realized.

In a further aspect, disclosed herein is that the lower deck can skidding below the supporting beams of the offshore platform already available.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 10 illustrates the lifting of the condenser;

FIG. 11 illustrates the placement under the condenser of roller skates, to allow the condenser to slide over the tracks;

FIG. 12A illustrates the roller skate over a truck;

FIG. 12B illustrates a perspective view from the bottom of a roller skate;

FIG. 12C illustrates a detail of the roller skate of FIG. 12B;

In the various figures, the same elements will be indicated with the same reference number.

DETAILED DESCRIPTION OF EMBODIMENTS

In offshore platforms, as well as in onshore sites, steam turbines are used for generating energy. Referring in particular to the offshore platforms, the steam turbines have to be transported and then installed on the platform. The steam turbines are very complicated plants and a remarkable amount of time and technical skills are required to install the same. According to one aspect, the present subject matter is directed to a steam turbine generator unit, comprising a steam turbine and all the equipment and parts for it to operate and generate energy, that is distributed on two independent modules or decks, a lower deck and an upper deck. Both the lower deck and the upper deck are pre-mounted and independently transportable. The upper deck has joint members, intended to be placed over at least two beams, so that the lower deck, where heavy parts of the steam turbine plant are arranged, is coupled or hanged from the upper deck, thus achieving a remarkable saving of space.

Figure 1:
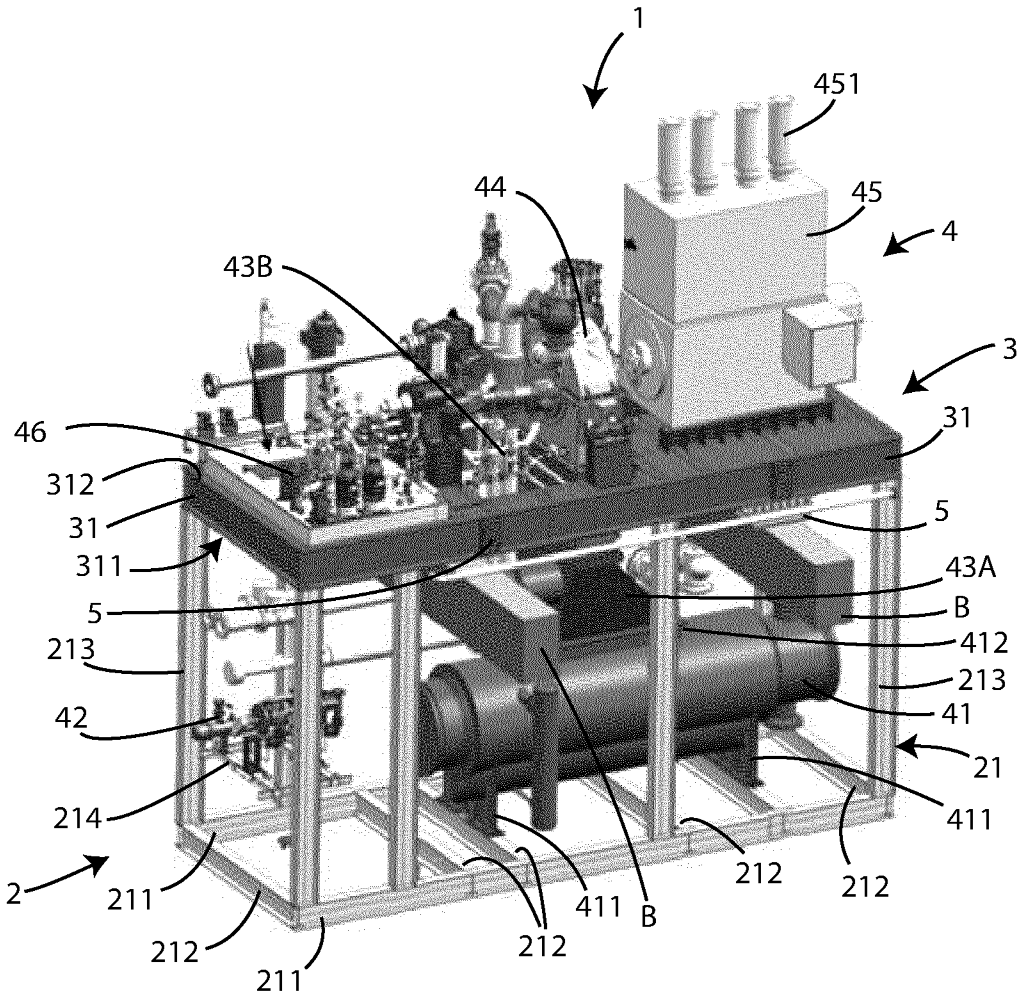
FIG. 1 illustrates a perspective view of a steam turbine generator module according to a first embodiment.
Figure 2:
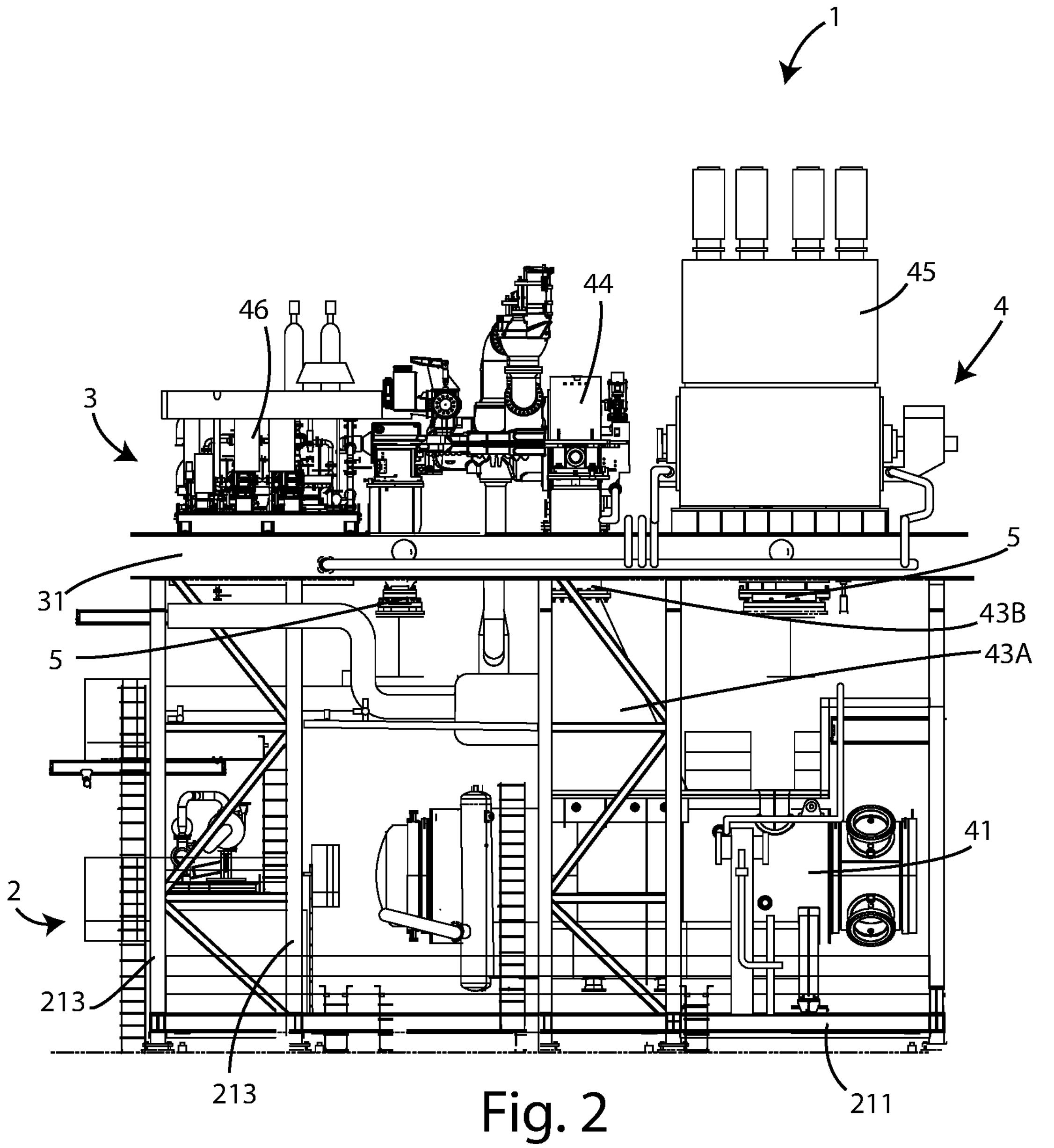
FIG. 2 illustrates a lateral view of the steam turbine generator module according to the first embodiment.
Figure 3:
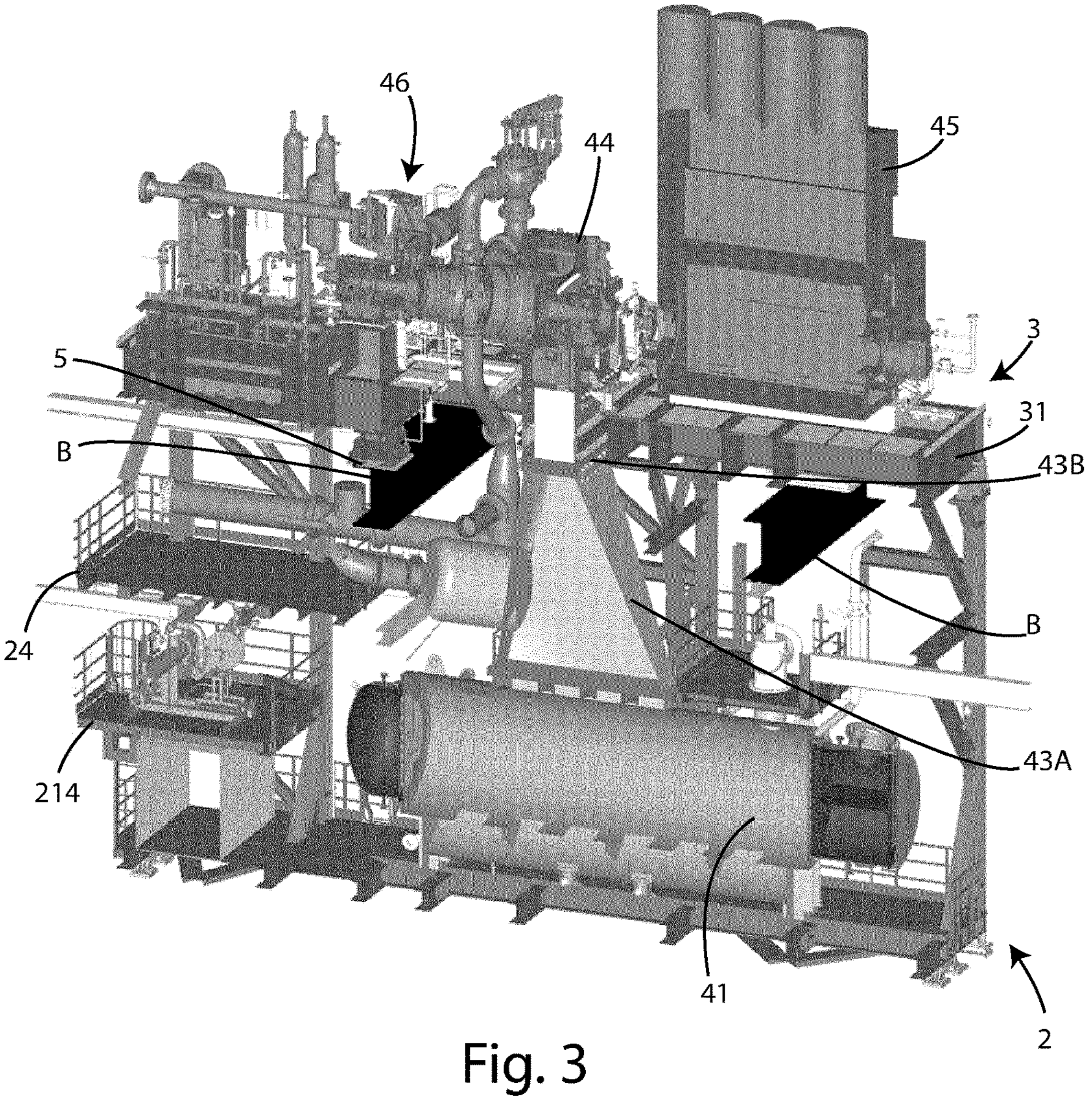
FIG. 3 illustrates a sectional perspective view of the steam turbine generator module according to the first embodiment.

Referring now to the drawings, FIGS. 1, 2, and 3 show a perspective view of a steam turbine generator unit, indicated with reference sign 1, intended to be installed on an offshore platform (not shown in the figure).

The steam turbine generator unit 1 comprises all the necessary parts for the steam turbine to operate. It is designed in order for it to be easily connected to the preinstalled equipment on the offshore platform. In other words, the steam turbine generator unit 1 is designed to be connected by means of suitable pipelines and to be power supplied so as to be immediately operational, with minimal effort to adapt it to the specific technical requirements or circumstances.

The steam turbine generator unit 1 comprises an upper deck 3 and a lower deck 2, that can be installed and coupled below the upper deck 3.

The lower deck 2 comprises a frame 21, including two main crosspieces 211, arranged parallel, and a set of transversal crosspieces 212, arranged parallel to each other and connected to the main crosspieces 211, so as to form a sort of bottom base, capable to support even large weights. Also, the frame 21 comprises a plurality of uprights 213, having an end fixed or welded to the crosspieces 211 or 212.

The frame also comprises shelves 214, connected between two uprights 213, on which possible devices can be installed.

The steam turbine plant, wholly indicated by the reference number 4, is installed on the above lower 2 and upper 3 decks, distributing the parts of the plant 4, in order to minimize the footprint of the steam turbine generator unit 1 and, at the same time, simplify the installation of the same.

More specifically, the lower deck 2 comprises a condenser 41, having at least two supports 411, removably fixed to the transversal crosspieces 212 of the frame 21 of the first deck 2, and a coupling flange 412, which operation will be better explained in the following. It is seen that the condenser 41 is installed at the bottom of the steam turbine generator unit 1, due to its weight and footprint.

The lower deck 2 also comprises a gland steam condenser 42, which, as is known, maintains a sub-atmospheric pressure at the outermost leak-off belt of the glands and thereby prevents the leakage of steam from the glands into the turbine hall.

Also, in the lower deck 2 an exhaust duct 43A and a flexible expansion joint 43B of the steam turbine generator 4 are installed. The exhaust duct 43A is removably coupled to the condenser 41 through the flange 412. The expansion joint 43B connects the exhaust duct 43A and the steam turbine, as better explained below.

The expansion joint 43B absorbs the relative displacements between the steam turbine generator 44 and the condenser 41. The layout of the steam turbine generator unit 1 limits the fatigue effect on transition duct 43A and on expansion joint 43B also, as better explained below. Moreover, the condenser 41 can be installed with the connection axis of the exhaust duct 43A aligned or with an offset that can be recovered with the appropriate transition duct (not shown). The expansion joint 43B compensates the possible misalignments between the condenser 41 and the steam turbine generator 44 possibly caused by the sea movement since the steam turbine generator unit 1 is installed in the offshore platform, subject, as known, to sea solicitations. Also, the expansion joint 43B is intended to compensate for any thermal extensions of the exhaust duct 43A.

The lower deck 2 comprises a baseplate 31, which in the present embodiment is made of stainless steel, but which can be made also of other metals or materials with similar mechanical properties. The baseplate 31 has a lower surface 311, facing the main crosspiece 211 and the transversal crosspieces 212, and an upper surface 312, opposed to the lower surface 311, on which, as better explained below, several components of the steam turbine plant 4 are installed. The baseplate 31 is fixed to the ends of the uprights 213 of the frame 21 of the lower deck 2.

The steam turbine generator unit 1 also comprises three joint members 5, placed and installed on the lower surface 311 of the baseplate 31, capable of supporting the lower module 3 and the lower deck 2, the latter placed below the baseplate 31. The three joint members 5 have the function also to amortize and dampen possible vibrations, due to the natural movement of the offshore platform, which the steam turbine generator unit 1 is installed on.

The three joint members 5 are not aligned and are intended to be placed over at least a pair of parallel beams B, which are part of the offshore platform, so that the baseplate 31 is placed over the parallel beams B. Then, the lower deck 2 remains suspended below the two beams B, namely below the plan formed by the beams B. More specifically, the two beams B passes between the lower deck 2 and the upper deck 3, supporting the weight of the entire steam turbine generator unit 1, which turns out to be supported over the three joint members 5. This positioning allows saving a remarkable amount of space and encumbrance, especially on an offshore platform.

Also, this configuration is suitable for single lift arrangement (if allowed by module layout) or with a separate installation of the lower deck 2 that will be connected directly at the site to the lower deck 2.

Still referring to FIGS. 1, 2, and 3, it is possible to see only two Anti Vibrations Mounts 5. In the embodiment at issue, the three joint members are Anti Vibrations Mounts (AVMs) 5. In other embodiments, the joint members 5 can be spherical joints.

Figure 4:
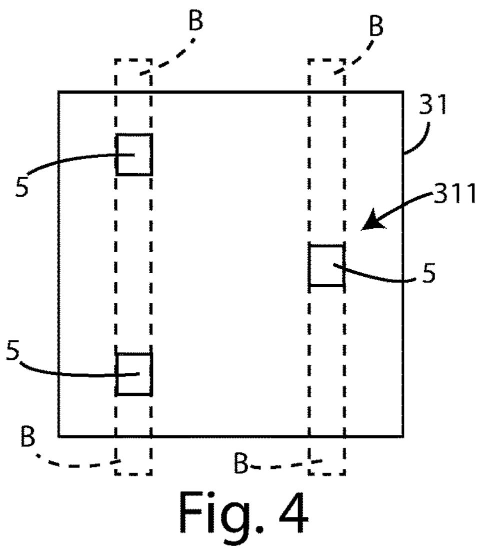
FIG. 4 illustrates a plan view of the lower surface of a base platform of the steam turbine generator module according to the first embodiment.

Referring to FIG. 4, it is possible to see how the three joint members 5 are distributed on the lower surface 311 of the baseplate 31 to obtain a 3-points (isostatic) configuration. In this embodiment the three joint members 5 are arranged so as to form a triangle. In FIG. 4, two joint members 5 rest on a first beam B (the beams are drawn in dashed line) and the third join member 5 rest on the other parallel beam B. By this configuration the steam turbine generator unit 1 is firmly positioned on the two beams B. Of course, a different number of join members 5 can be foreseen, so as to increase the stability of the system over parallel beams B. The three-point displacement allows, as mentioned, achieving a 3-point isostatic configuration, namely, the mechanical system has a number of degrees of constraint equal to the number of its degrees of freedom. The layout shown allows also optimal maintenance of the steam turbine generator unit 1.

Continuing referring to FIGS. 1, 2, and 3, the steam turbine plant 4 also comprises a steam turbine 44, installed over the baseplate 31, particularly on the upper surface 312 of the baseplate 31. The steam turbine 44 is connected to the expansion joint 43B and the exhaust duct 43A, through which it is also connected to the condenser 41. The steam turbine plant includes also a generator 45, equipped with cooler (air or water cooler) 451, also installed in upper surface 312 of the baseplate 31, close to the steam gas turbine 44, and connected thereto.

The steam turbine plant 4 is also equipped with a lube oil console 46, also installed on the upper surface 312 of the baseplate 31, and connected to the steam gas turbine 44 by pipes and valves, not specifically described here. The exhaust duct 43A is designed to fit the connection between the condenser 41 and the steam gas turbine 44. In this way, when the lower module 3 is installed above the lower deck 2, the exhaust duct 43A is immediately connected, avoiding adaptation problems, which often involve considerable waste of time in the installation procedures.

The upper deck 3 and the lower deck 2 of the steam turbine generator unit 1 form two pre-mounted subunits, which can be transported independently, and installed and connected autonomously. More specifically, the upper deck 3, comprised of the steam turbine 44, the generator 45, the lube oil console 46, and the three joint members 5, fixed on the lower surface of the baseplate 31, form a first or upper pre-mounted module, which can be transported on the offshore platform.

The lower deck 2, comprised of frame 21, the condenser 41, the gland steam condenser 42, and the exhaust duct 43A, form a second or lower pre-mounted module, which, in its turn, can be transported on the offshore platform independently of the first or upper pre-mounted module.

In some embodiments, the condenser 41 may be transported independently of the other parts of the lower deck 2, in view of the encumbrance and the weight of this component. Mode details on the transportation and the installation of the steam turbine generator unit 1 and then of the steam turbine plant 4 will be given below.

In general, the upper deck 3 is then placed on the pair of parallel beams B, which are part of the structure of the offshore platform, placing two join members 5 on a first beam B, and placing the other join member 5 on the other beam B. Then the upper deck 3 and the lower deck 2 are connected and then the expansion joint 43B connects the exhaust duct 43A and steam turbine generator 44.

Finally, the pipes, the valves, other electrical connections, and other auxiliary components, required for the operation of the steam turbine plant 4, are connected and tested.

It is apparent the ease of mounting the steam turbine generator unit 1, just combining two decks, one over the other, and connecting the rest of the parts, for allowing the steam turbine plant 4 to operate. The lower deck 2, and in particular the condenser 41, is then hanged below the upper deck 3. The upper deck 3 is then supported by the beams B.

This solution allows maintenance on the lower deck 2 so that the main items can be done using overhead monorails, davits, or with sliding structures installed below the equipment.

A different number of join members 5 can be foreseen, so as to increase the stability of the system over parallel beams B.

Also, the layout, in addition to be compact, also shows allows optimal maintenance of the steam turbine generator unit 1.

Figure 5:
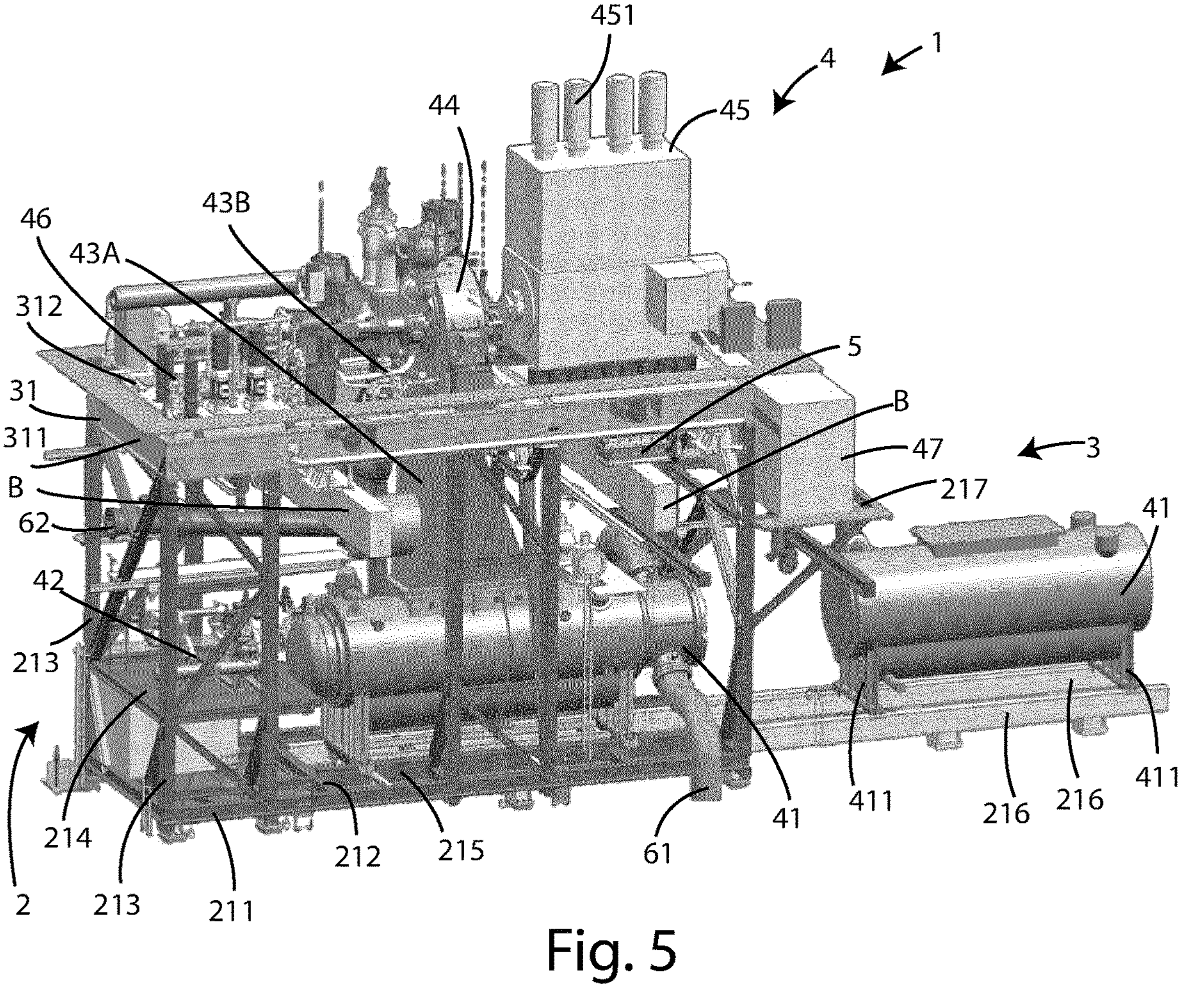
FIG. 5 illustrates a first perspective view of a steam turbine generator module, according to a second embodiment.
Figure 6:
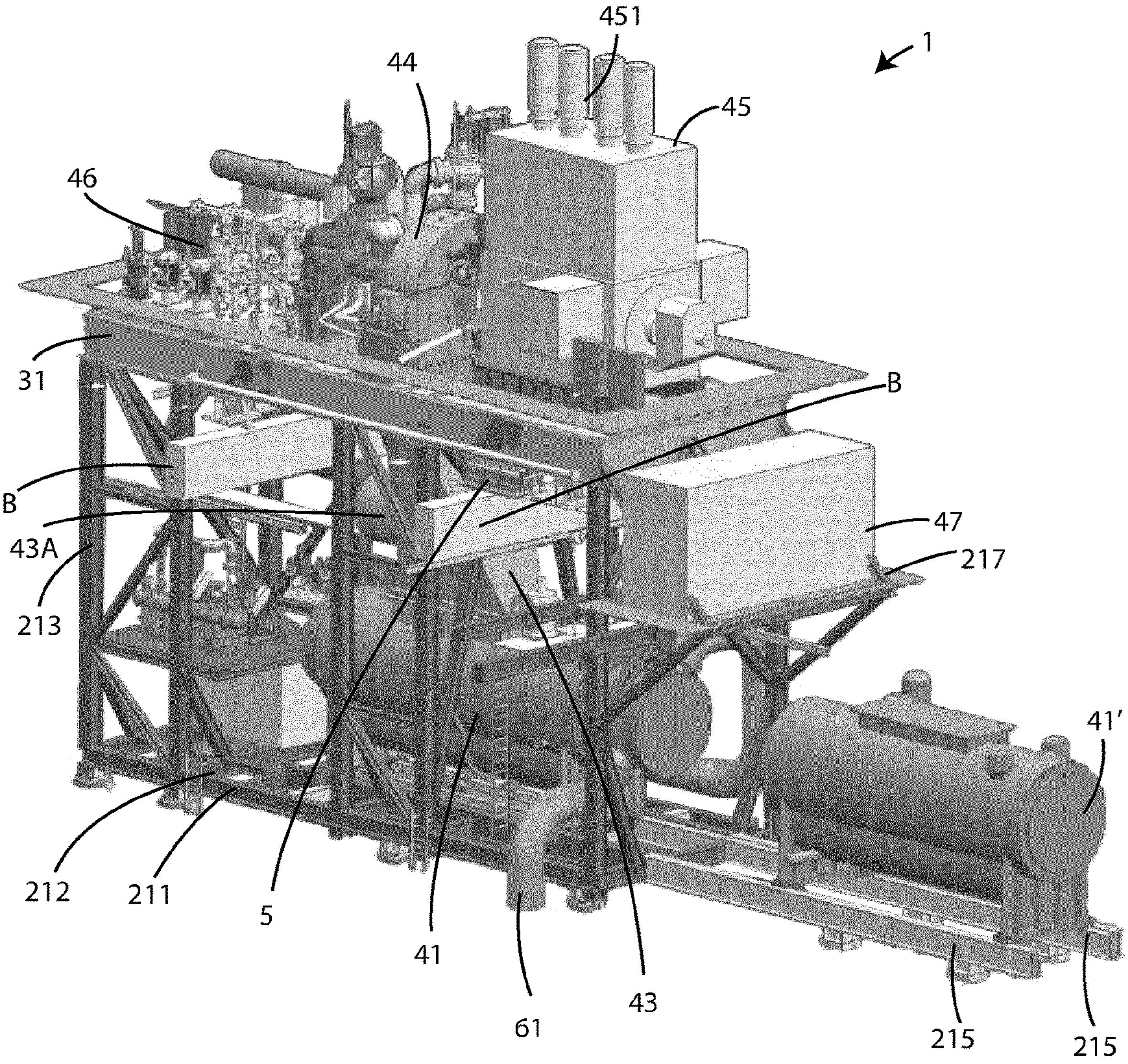
FIG. 6 illustrates a second perspective view of the steam turbine generator module according to the second embodiment.
Figure 7:
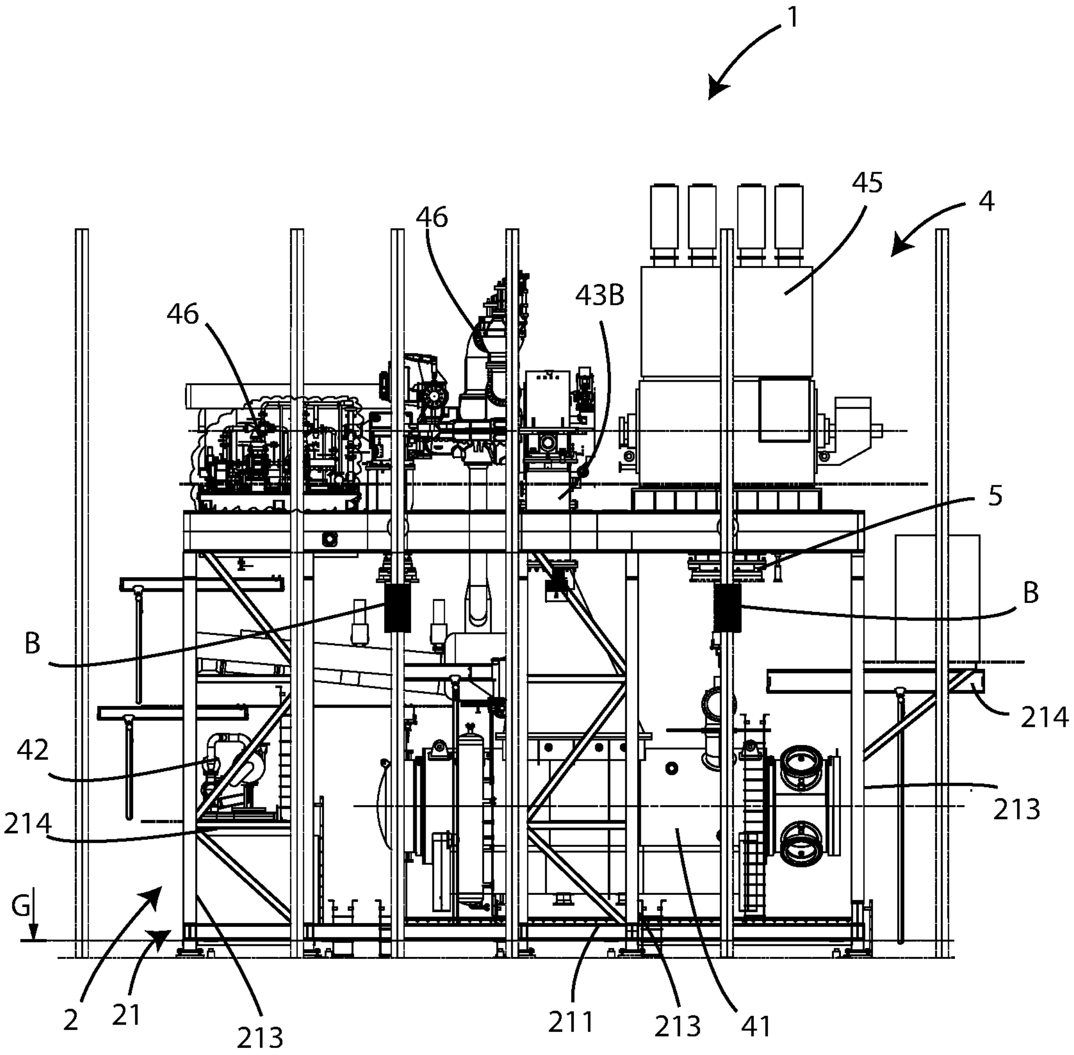
FIG. 7 illustrates a lateral view of the steam turbine generator module according to the second embodiment.

Referring now to FIGS. 5, 6, and 7, a second embodiment of a steam turbine generator unit 1 is illustrated, where it can be in particular seen the installation of the condenser 41. More specifically, in this embodiment, the frame 21 comprises two fixed tracks 215, on which the condenser 41 is installed, and two removable tracks 216.

The condenser 41 in FIGS. 5, 6, and 7 is shown in two different positions, namely an extracted position, where the condenser is indicated with the reference number 41' and in which it is possible to carry out any maintenance activity to the same, and an installed position, where the condenser is indicated with the reference number 41. Once the condenser 41 passes from the extracted position to the installed position, the exhaust duct 43A is connected to the condenser 41, so as to fluid-dynamically connect it to the steam gas generator 44 also through the expansion joint 43B. Also, to pass from the installed position to the extracted position, the condenser 41 can move on the fixed 215 *e* removable 216 tracks as better specified below. The removing of the removable tracks 216 reduces the overall footprint of the decks already installed.

Figure 8:
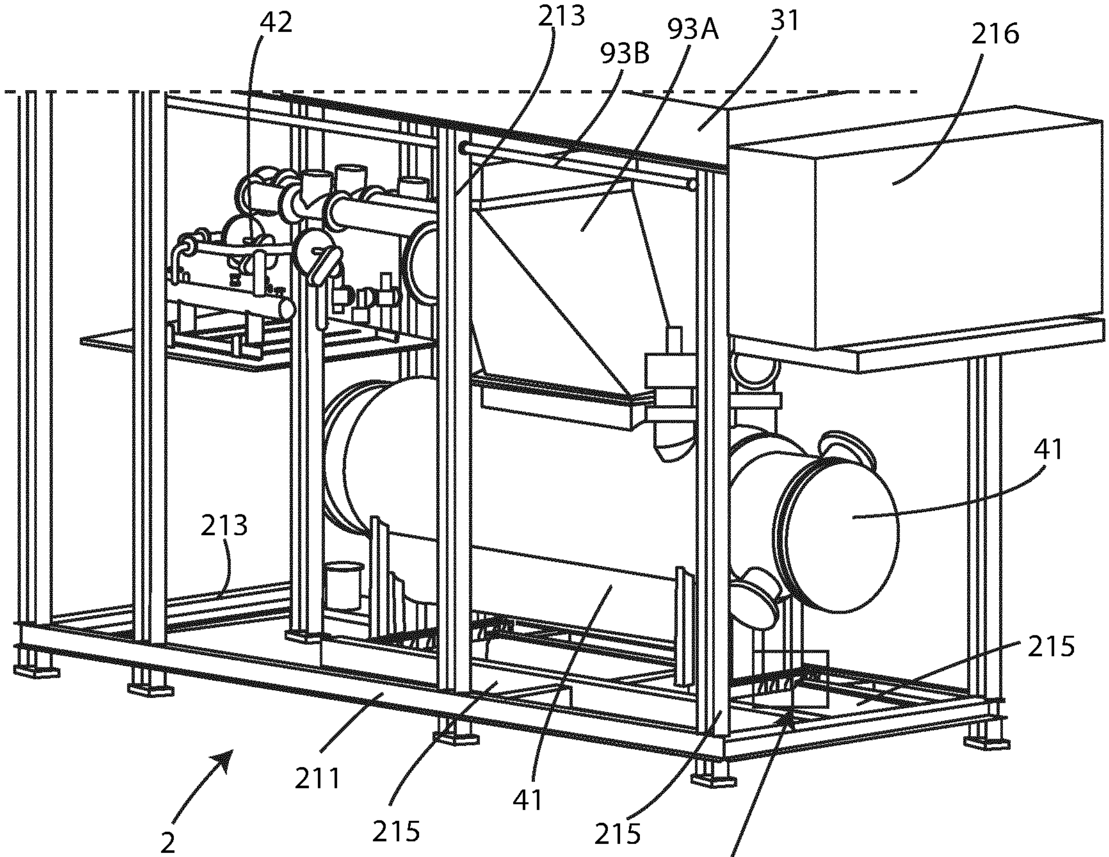
FIG. 8 illustrates the lower deck of the steam turbine generator unit from which condenser as to be expected.
Figure 9:
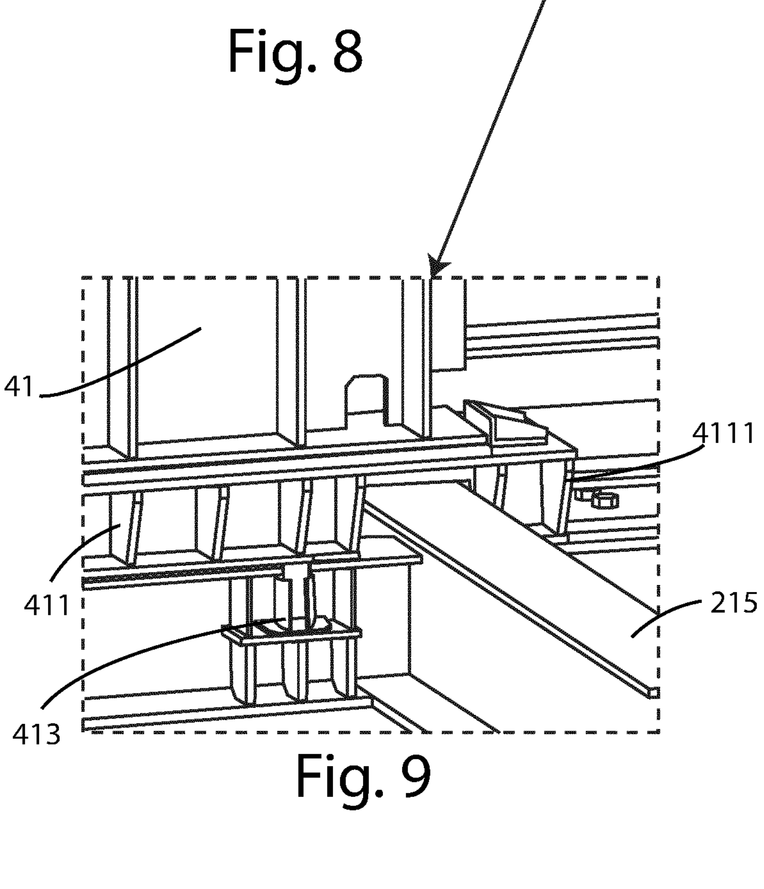
FIG. 9 illustrates a detail of FIG. 8.
Figure 13:
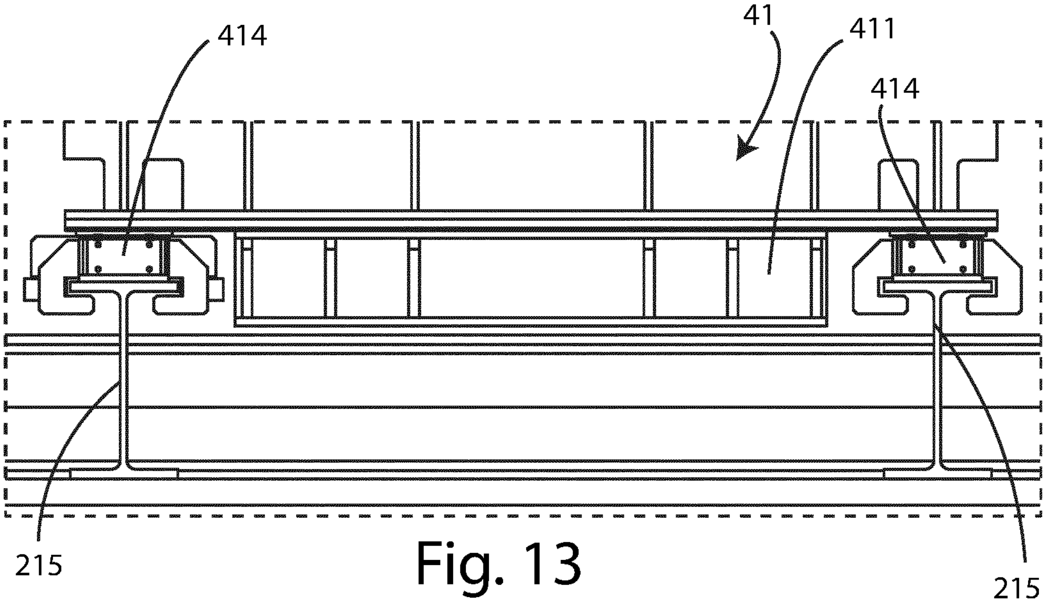
FIG. 13 illustrates the block of the condenser in a specific opposition.
Figure 14:
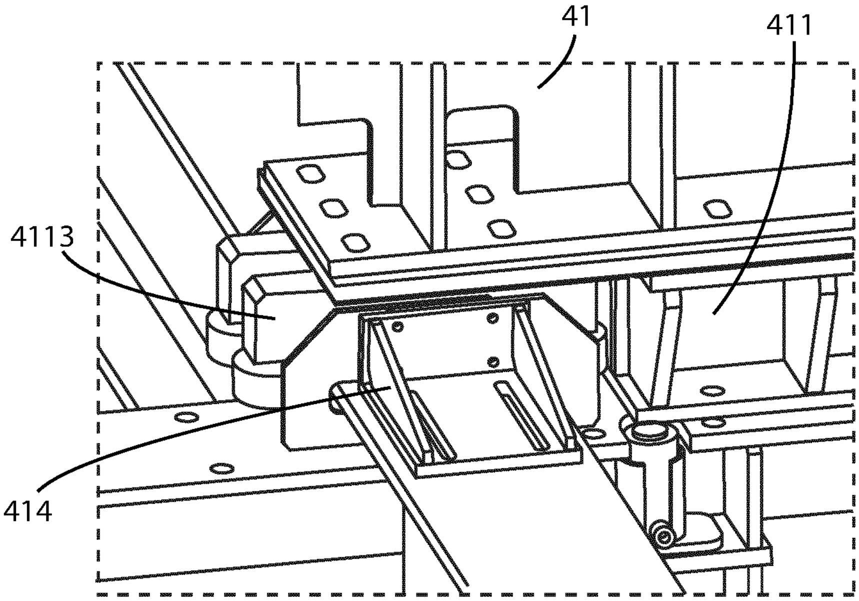
FIG. 14 illustrates a detail of FIG. 13.

Referring to FIGS. 8, 9, 10, 11, 12, 13, 14, 15, 16, 17, and 18 the extraction procedure of the condenser 41 is shown. More specifically, the FIGS. 8 and 9 show that each one of the supports 411 comprises at the ends saddles 4111, whereby it rests on the tracks 215, and blocking bracket 4112, to block the cylinder 41 in position once reached the right position.

To extract the condenser 41, it has to be lifted first, and so it is foreseen the installation of hydraulic cylinder jacks between the supports 411 and the fixed tracks 215. In this way, condenser 41 is lifted from the sliding saddle side.

Then, as it can be seen in FIGS. 11, 12A, 12B, and 12C, roller skates 4113 are mounted below the condenser 41, to allow it to slide over the fixed tracks 215. The roller skates 4113 are roller devices capable of supporting high weights and allow them to slide. Subsequently (see FIGS. 13 and 14), the condenser 41 is lowered down, until the roller skates 4113 touch on the fixed tracks 215 and on front and rear, longitudinal locking bracket 414, to keep the condenser 41 in position. The longitudinal locking brackets 414 are each connected to the fixed tracks 215, or, depending on the position of the condenser during the extraction procedure, to the removable tracks 216, by bolts.

Figure 15:
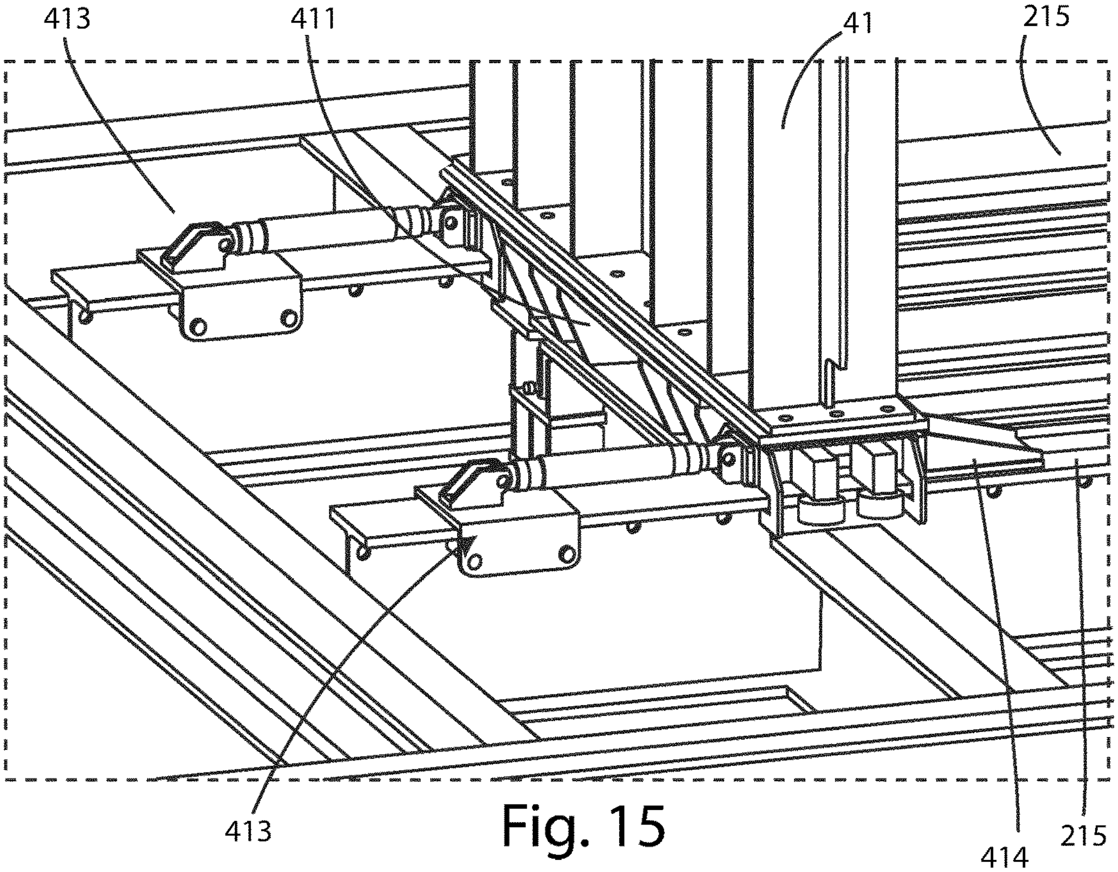
FIG. 15 illustrates the installation of hydraulic actuators over the fixed tracks.
Figure 16:
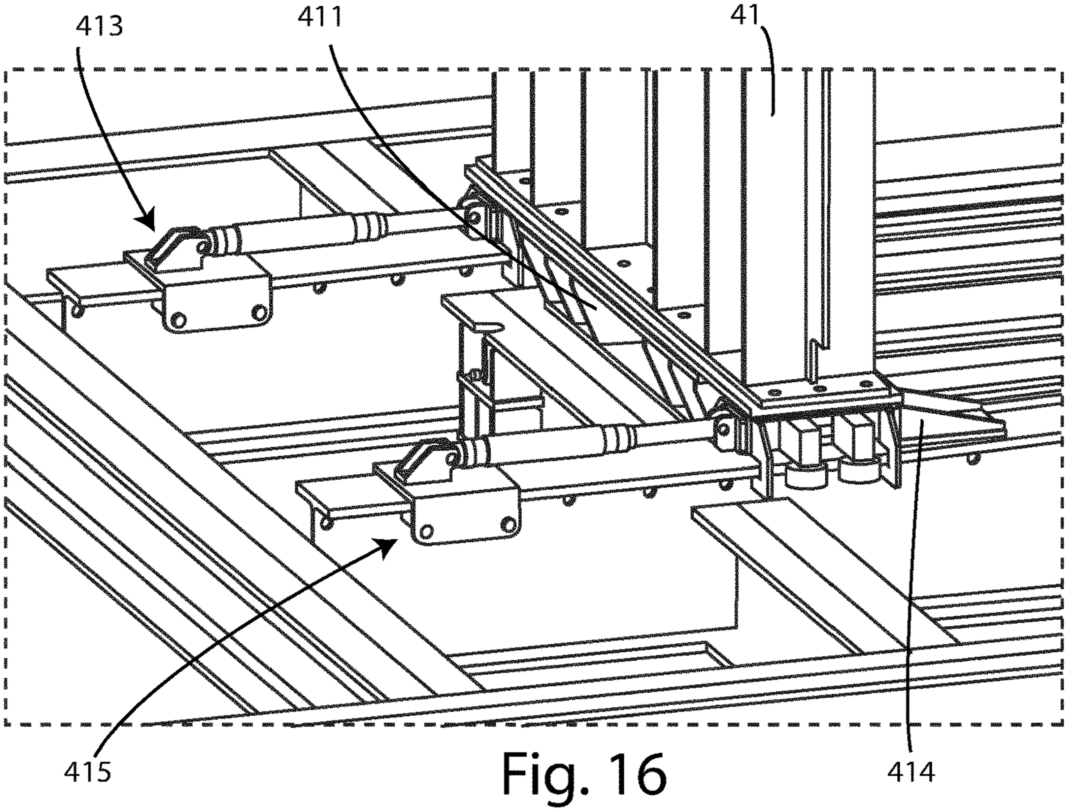
FIG. 16 illustrates the operation of the hydraulic actuators of FIG. 15.
Figure 17:
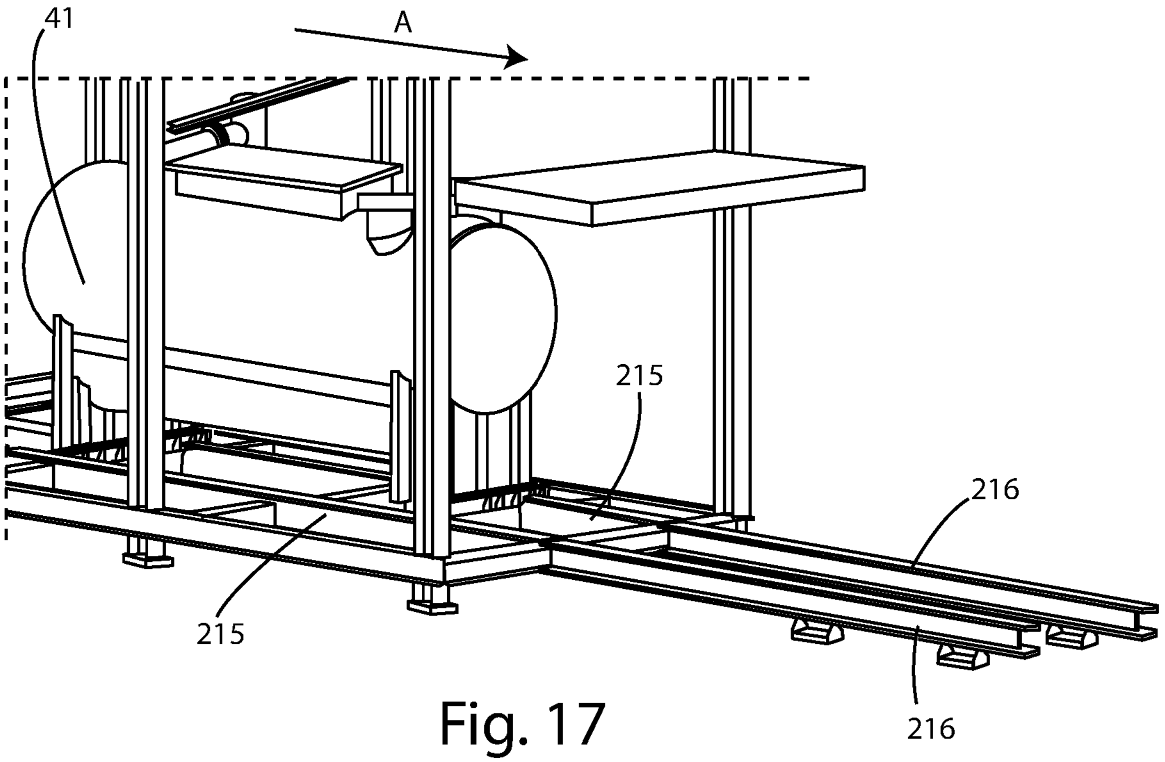
FIG. 17 illustrates the coupling of two removable tracks.
Figure 18:
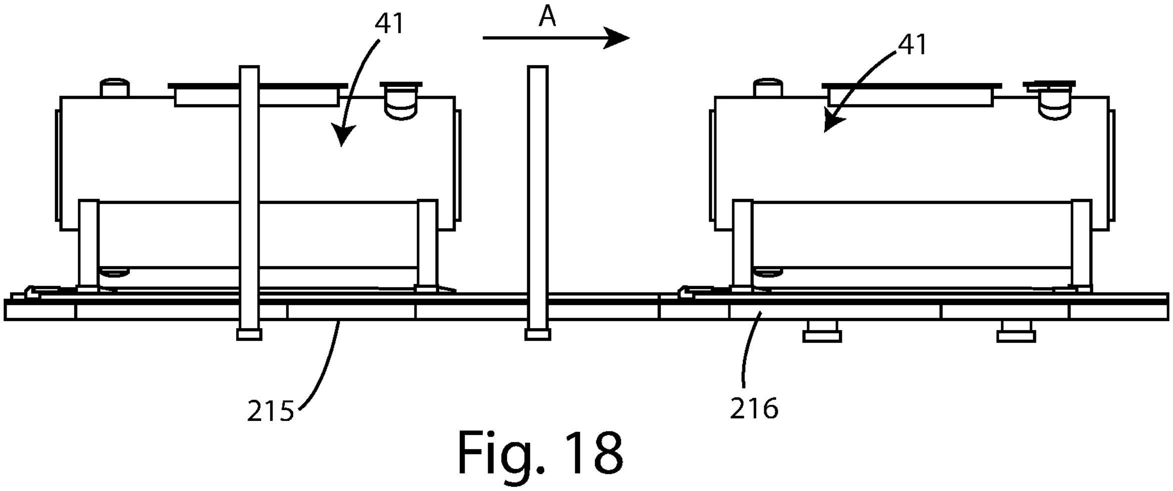
FIG. 18 illustrates the installed and extracted position of the condenser.

Referring to FIG. 15, hydraulic actuators 413 are then installed on the fixed tracks 215 and connected to the supports 411. By actuating the hydraulic actuators 413 the condenser 41 can slide on the two fixed tracks 215, according to the direction of the arrow A (see FIG. 16). Also, the removable tracks 215 are added (see FIG. 17), so that the condenser 41 can pass from the installed position of FIG. 17 to the extracted position of FIG. 18.

In particular, the condenser 41 extraction is carried out according to the procedure below:

installing the removable tracks 216;

removing the connection bolts from all longitudinal locking brackets 414;

actuating the hydraulic actuators 413 for a stroke, usually around 250 mm, in order not to exceed 5 m/min for translation speed;

once the stroke is completed, screwing again bolts, which are four for each locking bracket 414.

The procedure is repeated until the condenser 41 reaches the desired position on the removable tracks 216. The procedure for passing from the extracted position to the installed position is the same, inverting the steps.

Still referring to FIGS. 5, 6, and 7, the frame 21 of the lower deck 2 of the steam turbine generator unit 1 comprises an additional shelf 217, where a vacuum group 47 is installed.

It is also seen that the condenser 41 is connected to a cooling pipe 61 and the steam turbine 44 is connected to an extraction pipe 62, which passes through the lower deck 2, below the baseplate 31, thus, saving space.

Also, it is possible to see one of the three joint members 5, which is placed on top of one of the beams B.

The steam turbine generator unit 1 structure disclosed is particularly convenient for its installation flexibility, since it can be adapted to the circumstances, requiring or not the lateral skidding of the lower deck.

Figure 19:
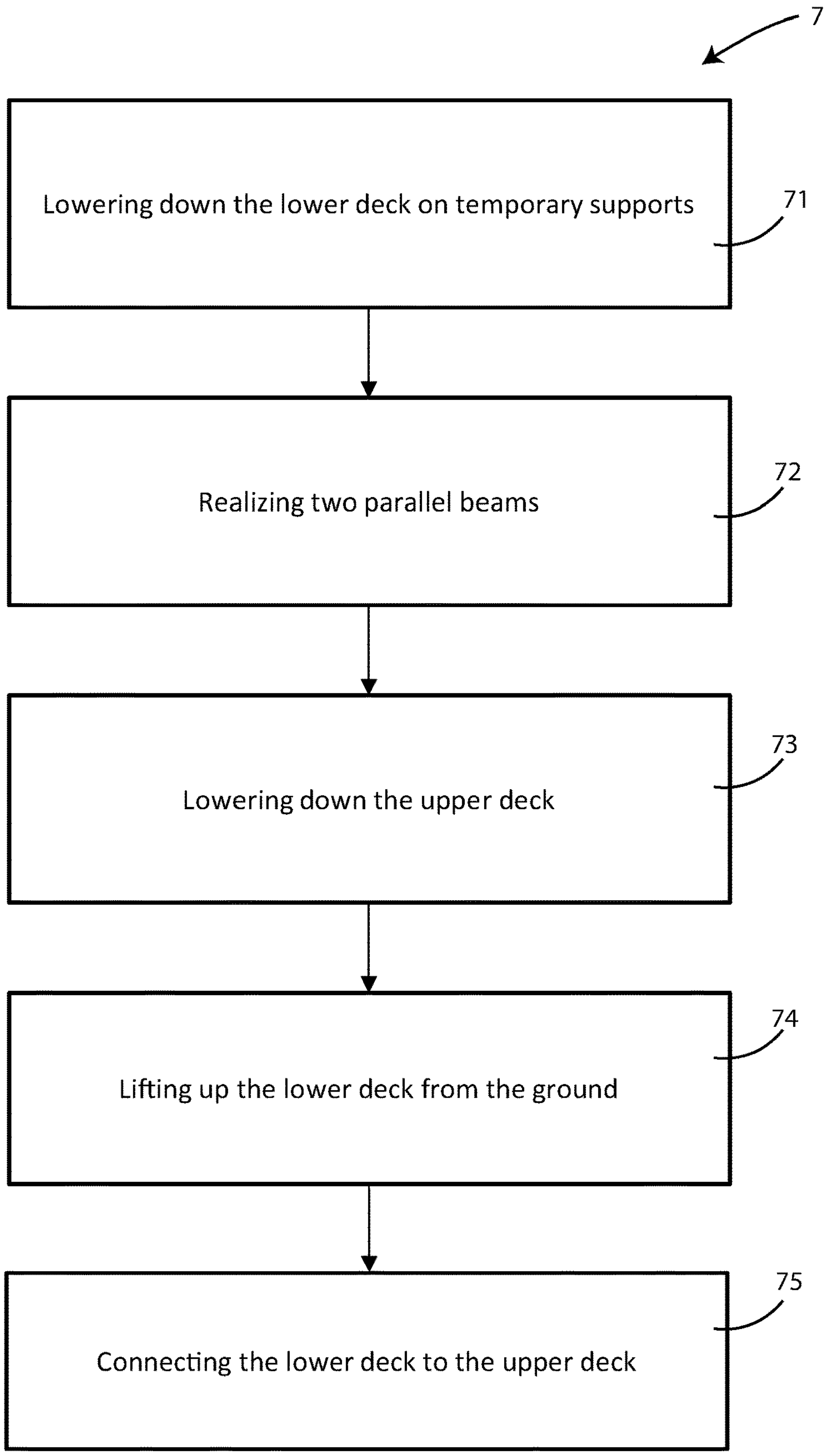
FIG. 19 illustrates a flowchart of a first method of installing a steam turbine generator module.

More specifically, FIG. 19 shows a flowchart of a first method 7 of installation of a steam turbine generator unit 1, whose steps are also illustrated in the FIGS. 20, 21, 22, 23, and 24.

As mentioned above, the upper deck 3 and the lower deck 2 are preinstalled, namely, they are realized and assembled in the factory and independently transported. In particular, the condenser 41 is installed on the lower deck 2, and also all the other parts of the steam turbine plant 4 are already installed on the upper deck 3 as well as on the lower deck 2. Hence, the upper deck 3 and the lower deck 2 are prepared in the factory.

Also, the first installation method 7 is particularly used in case the beams B, on which the steam turbine generator unit 1 has to be arranged are not available yet.

Figure 20:
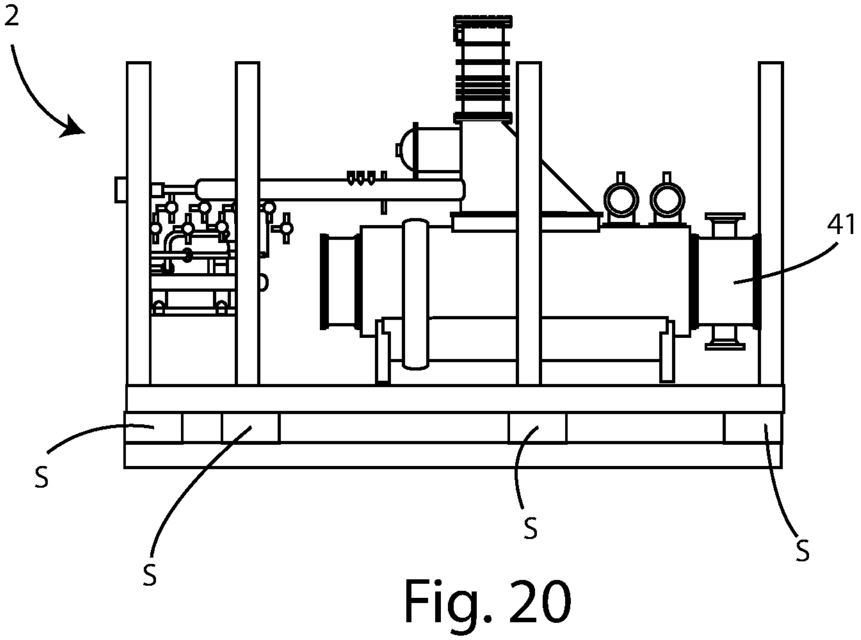
FIG. 20 illustrates a first step of the method of FIG. 19.

The installation method 7 comprises the step of lowering down 71 the lower deck 2 on temporary supports S, placed on the ground G, such that the temporary supports lie between the ground G and the lower deck 2 (see FIG. 20). The exhaust duct 43A and the expansion joint 43B are installed too.

Figure 21:
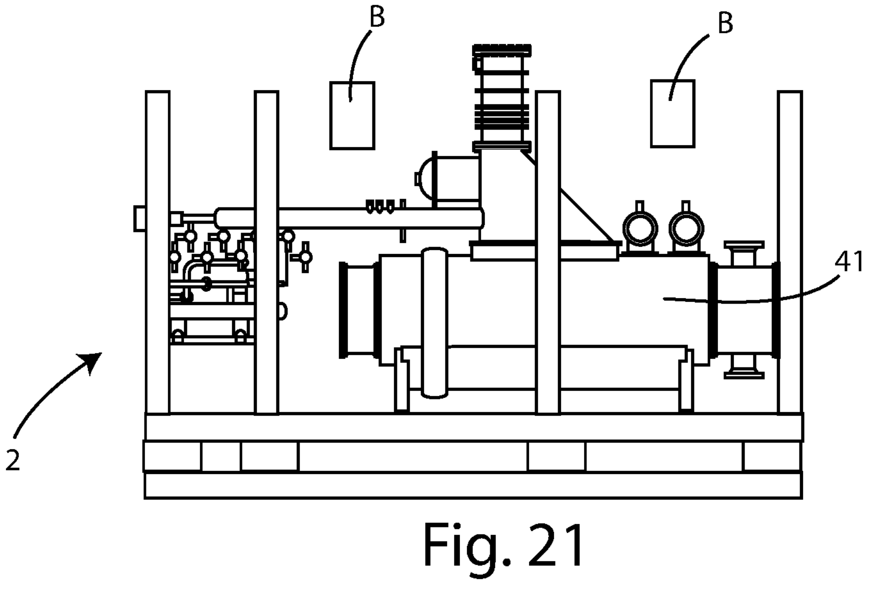
FIG. 21 illustrates a second step of the method of FIG. 19.
Figure 22:
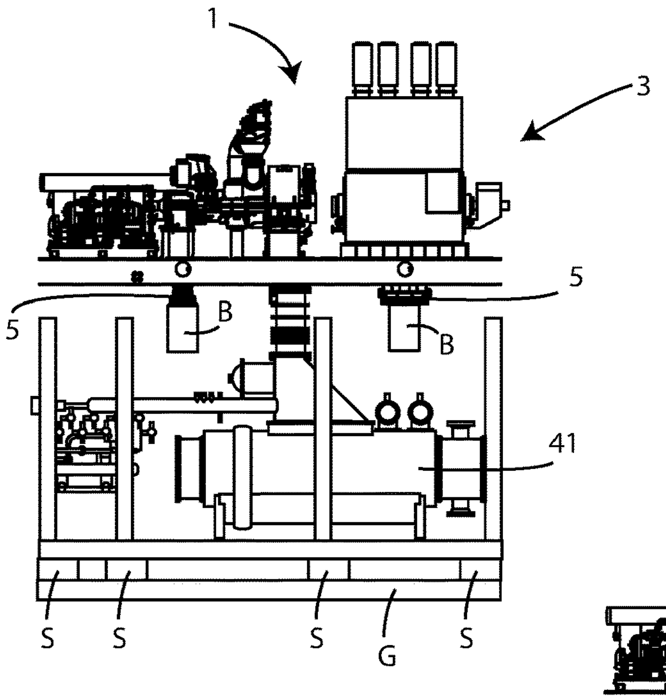
FIG. 22 illustrates a third step of the method of FIG. 19.
Figure 23:
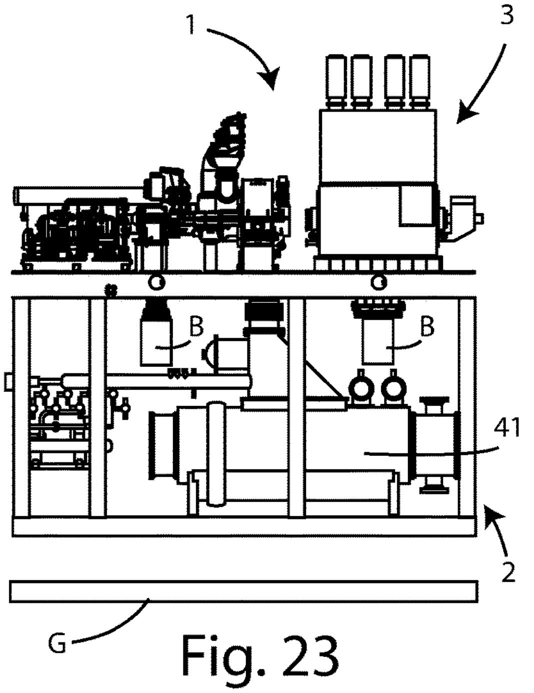
FIG. 23 illustrates a fourth step of the method of FIG. 19.
Figure 24:
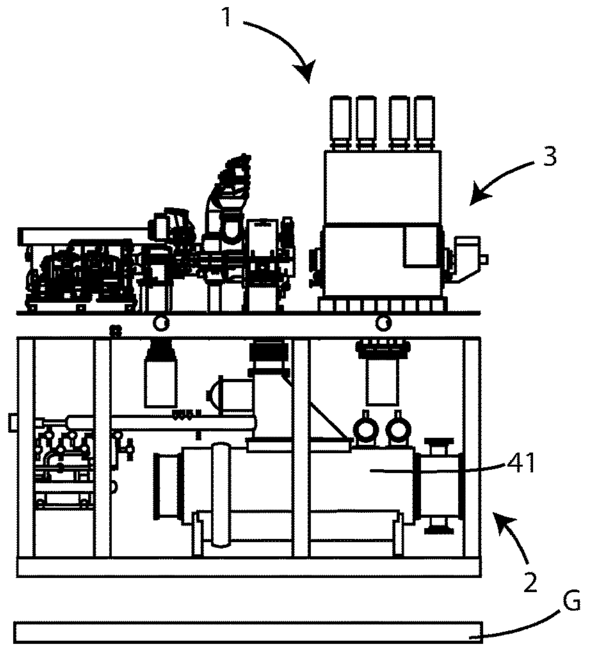
FIG. 24 illustrates a fifth step of the method of FIG. 19.

Then the two (or more) parallel beams B are built (step 72, FIG. 21). As it can be seen in FIG. 21, the parallel beams B occupy part of the volume of the lower deck 2.

Then, the upper deck 3 is lowered down (step 73, FIG. 23) in this step, the baseplate 31 is placed over the two parallel beams B. In particular, the joint members 5 preinstalled on the baseplate 31 are coupled to the beams B.

In the lifting up step 74, the lower deck 2 is lifted up from the ground G, usually by jacks (not shown in the figures), and in the connecting step 75, the lower deck 2 is connected to the upper deck 3.

Figure 25:
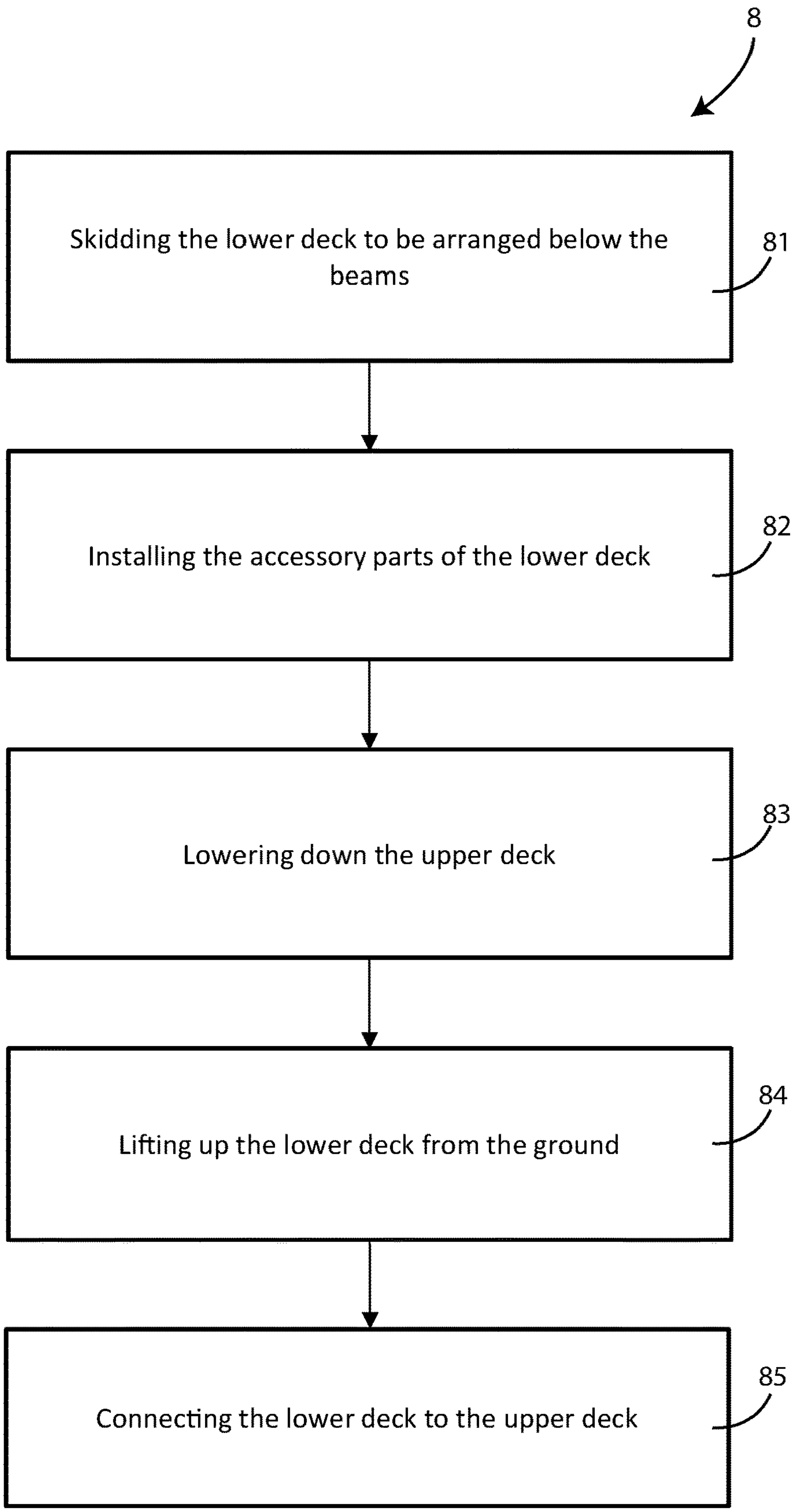
FIG. 25 illustrates a flowchart of a second method of installing a steam turbine generator module.

In case of the beams B are already available, a slightly different installation method can be carried out. FIG. 25 shows the second method of installation 8 of the steam turbine generator unit 1.

Figure 26:
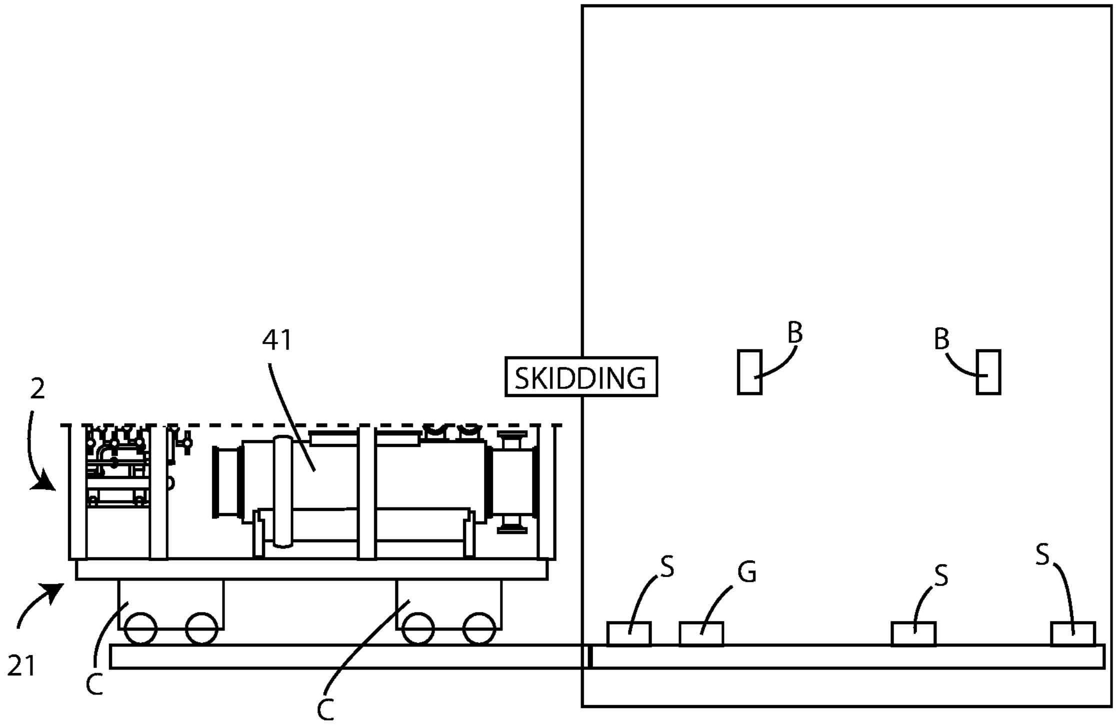
FIG. 26 illustrates a first step of the method of FIG. 25.

In this case, the first skidding step 81 of the installation method 8 is carried out, where the lower deck 2 is pushed to be arranged below the beams B. In particular, the lower deck 2 skids by means of carriages C, to place the lower deck 2 in the right position below the beams B, as can be seen in FIG. 26.

Figure 27:
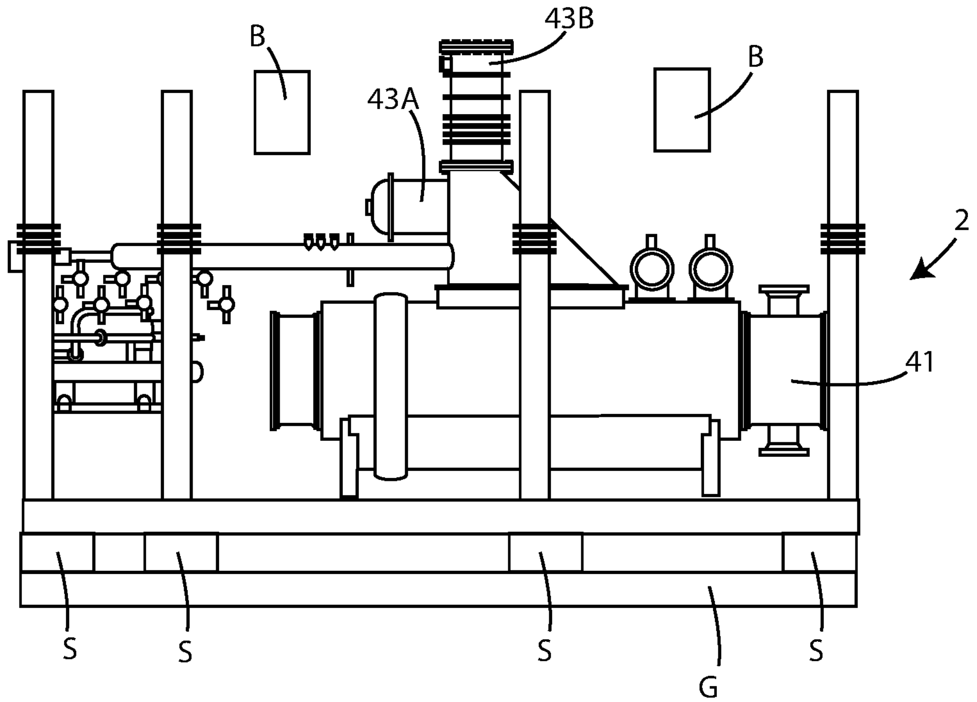
FIG. 27 illustrates a second step of the method of FIG. 25.

In the installing step 82, the accessory parts of the lower deck 2 are installed, such as, by way of example, piping valves, monorails, and ladders, as it is illustrated in FIG. 27.

Figure 28:
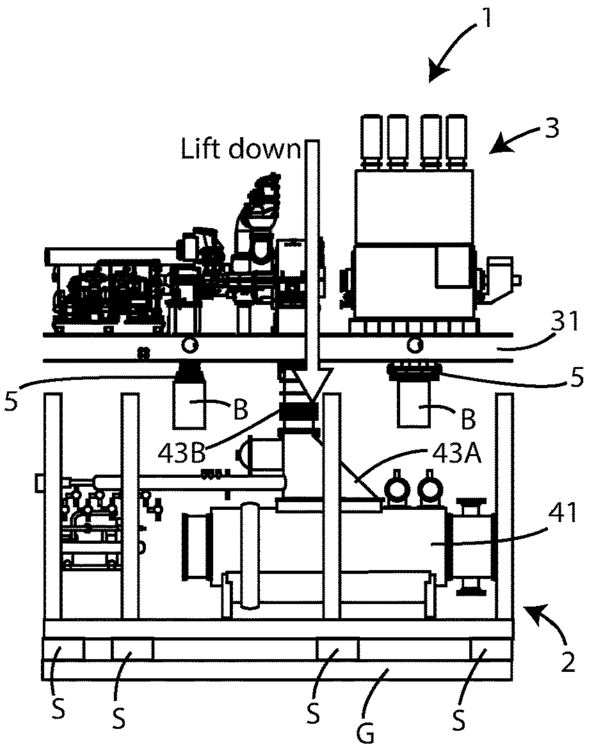
FIG. 28 illustrates a third step of the method of FIG. 25.

Then, likewise step 73 of the first installation method 7, the upper deck 3 is lifted down (step 83, FIG. 28). In this step, the baseplate 31 is placed over the two parallel beams B. In particular, the joint members 5 preinstalled on the baseplate 31 are coupled to the beams B.

Figure 29:
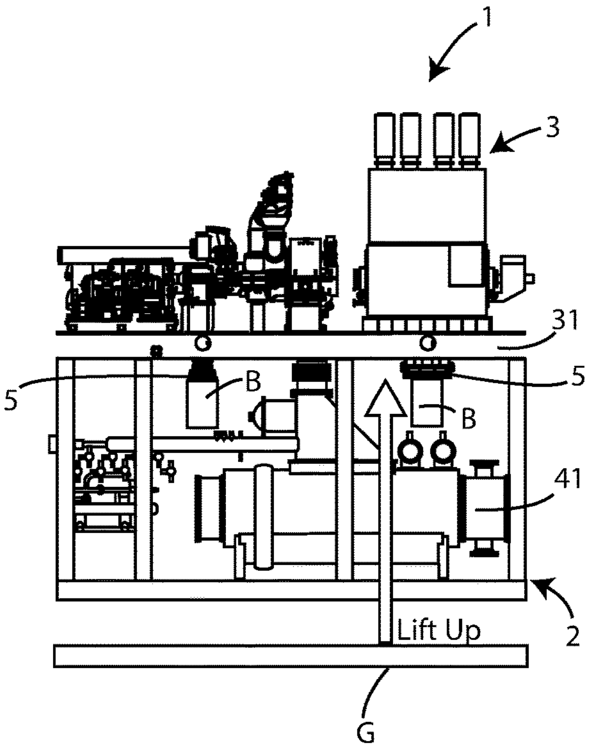
FIG. 29 illustrates a fourth step of the method of FIG. 25.
Figure 30:
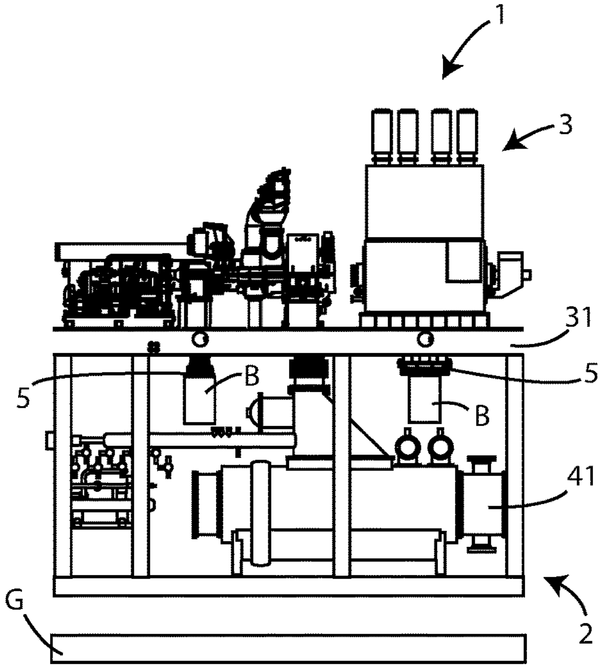
FIG. 30 illustrates a fifth step of the method of FIG. 25.

Subsequently, in the lifting up step 84, the lower deck 2 is lifted up from the ground G (see FIG. 29), usually by jacks (not shown in the figures), and in the connecting step 85 (see FIG. 30), the lower deck 2 is connected to the upper deck 3.

While aspects of the invention have been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A steam turbine generator unit, comprising:

a lower deck;

an upper deck coupled to the lower deck, the upper deck comprising a baseplate with an upper surface and a lower surface;

a steam turbine generator having a first part installed on the upper surface of the baseplate;

two parallel beams disposed below the lower surface of the baseplate; and at least three joint members positioned between the lower surface of the baseplate and the two parallel beams, wherein none of the at least three joint members are aligned with one another in a direction perpendicular to the two parallel beams.

2. The steam turbine generator unit of claim 1, wherein the at least three joint members are anti vibrations mounts or spherical joints.

3. The steam turbine generator unit of claim 1, wherein the lower deck has a frame that comprises a plurality of uprights, wherein an end of the uprights of the frame of the lower deck is removably coupled to the lower surface of the baseplate, and wherein the steam turbine generator has a second part installed on the frame of the lower deck.

4. The steam turbine generator unit of claim 3, wherein the lower deck comprises:

two main crosspieces arranged parallel to each other; and a set of transversal crosspieces arranged parallel to each other and connected to the two main crosspieces, wherein the plurality of uprights have an end fixed to the main cross pieces or to the transversal crosspieces.

5. The steam turbine generator unit of claim 4, wherein the steam turbine generator comprises:

a condenser installed on the frame of the lower deck, wherein the condenser has a coupling flange; and a gland steam condenser installed on the frame of the lower deck, wherein the condenser and the gland steam condenser are preinstalled on the frame of the lower deck.

6. The steam turbine generator unit of claim 3, wherein the steam turbine generator comprises:

a steam turbine installed on the upper surface of the baseplate and arranged in correspondence of a condenser; and a generator installed on the upper surface of the baseplate, wherein the steam turbine and the generator are preinstalled on the baseplate of the lower module.

7. The steam turbine generator unit of claim 5, wherein the steam turbine generator comprises:

an exhaust duct connected to a coupling flange of the condenser; and an expansion joint connected between the exhaust duct and the steam turbine.

8. The steam turbine generator unit of claim 7, wherein the condenser comprises at least two supports removably fixed to the frame.

9. The steam turbine generator unit of claim 5, wherein the frame comprises:

two fixed tracks along which the condenser can be installed; and two removable tracks that can be installed in order to be a continuation of the fixed tracks, wherein the condenser is adapted to pass from an installed position, in which it is installed in the lower deck of the steam turbine generator unit, to an extracted position, in which it is extracted from the lower deck of the steam turbine generator unit, to allow the maintenance operations.

10. The steam turbine generator unit of claim 1, wherein the three joint members form a three-point isostatic configuration.

* * * * *